United States Patent
Kowdle et al.

(10) Patent No.: US 10,839,539 B2
(45) Date of Patent: Nov. 17, 2020

(54) SYSTEM AND METHOD FOR ACTIVE STEREO DEPTH SENSING

(71) Applicant: Google LLC, Mountain View, CA (US)

(72) Inventors: Adarsh Prakash Murthy Kowdle, San Francisco, CA (US); Vladimir Tankovich, Renton, WA (US); Danhang Tang, Mountain View, CA (US); Cem Keskin, San Francisco, CA (US); Jonathan James Taylor, Mountain View, CA (US); Philip L. Davidson, Arlington, MA (US); Shahram Izadi, Tiburon, CA (US); Sean Ryan Fanello, Mountain View, CA (US); Julien Pascal Christophe Valentin, Mountain View, CA (US); Christoph Rhemann, Mountain View, CA (US); Mingsong Dou, Mountain View, CA (US); Sameh Khamis, Mountain View, CA (US); David Kim, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 133 days.

(21) Appl. No.: 15/994,509

(22) Filed: May 31, 2018

(65) Prior Publication Data
US 2018/0350087 A1 Dec. 6, 2018

Related U.S. Application Data

(60) Provisional application No. 62/513,181, filed on May 31, 2017.

(51) Int. Cl.
*G06T 7/593* (2017.01)
*G06T 7/521* (2017.01)
(Continued)

(52) U.S. Cl.
CPC .............. *G06T 7/593* (2017.01); *G06T 7/32* (2017.01); *G06T 7/337* (2017.01); *G06T 7/521* (2017.01);
(Continued)

(58) Field of Classification Search
CPC .... H04N 13/0081; H04N 13/271; G06T 7/32; G06T 7/337; G06T 7/521; G06T 7/593;
(Continued)

(56) References Cited

U.S. PATENT DOCUMENTS 9,325,973 B1 4/2016 Hazeghi et al.
9,803,975 B2* 10/2017 Moed .................. G06K 9/2027
(Continued)

OTHER PUBLICATIONS

Fanello, et al. (HyperDepth: learning Depth from Structured Light Without Matching), IEEE, pp. 5441-5450.. (Year: 2016).*
(Continued)

*Primary Examiner* — Daniel G Mariam

(57) ABSTRACT

An electronic device estimates a depth map of an environment based on stereo depth images captured by depth cameras having exposure times that are offset from each other in conjunction with illuminators pulsing illumination patterns into the environment. A processor of the electronic device matches small sections of the depth images from the cameras to each other and to corresponding patches of immediately preceding depth images (e.g., a spatio-temporal image patch "cube"). The processor computes a matching cost for each spatio-temporal image patch cube by converting each spatio-temporal image patch into binary codes and defining a cost function between two stereo image patches as the difference between the binary codes. The processor minimizes the matching cost to generate a disparity map, and optimizes the disparity map by rejecting outliers using
(Continued)

a decision tree with learned pixel offsets and refining subpixels to generate a depth map of the environment.

26 Claims, 5 Drawing Sheets

(51) Int. Cl.
- G06T 7/32 (2017.01)
- G06T 7/33 (2017.01)
- H04N 13/271 (2018.01)
- H04N 13/00 (2018.01)

(52) U.S. Cl.
CPC . *H04N 13/271* (2018.05); *G06T 2207/10021* (2013.01); *G06T 2207/10024* (2013.01); *G06T 2207/10028* (2013.01); *G06T 2207/10152* (2013.01); *G06T 2207/20072* (2013.01); *G06T 2207/20076* (2013.01); *G06T 2207/20081* (2013.01); *H04N 2013/0081* (2013.01)

(58) Field of Classification Search
CPC . G06T 2207/10028; G06T 2207/10152; G06T 2207/10024; G06T 2207/10021; G06T 2207/20072; G06T 2207/20076; G06T 2207/20081
USPC .................................. 382/154, 209; 348/47
See application file for complete search history.

(56) References Cited

U.S. PATENT DOCUMENTS

| | | | |
|---|---|---|---|
| 2012/0262553 A1 | 10/2012 | Chen et al. | |
| 2012/0294510 A1 | 11/2012 | Zhang et al. | |
| 2013/0100256 A1* | 4/2013 | Kirk | G06T 7/593 348/48 |
| 2014/0078264 A1 | 3/2014 | Zhang | |
| 2014/0240464 A1 | 8/2014 | Lee | |
| 2017/0186167 A1* | 6/2017 | Grunnet-Jepsen | G06T 7/521 |
| 2018/0091798 A1* | 3/2018 | Chang | H04N 13/271 |
| 2018/0189550 A1* | 7/2018 | McCombe | G06K 9/00288 |

OTHER PUBLICATIONS

Kowdle et al., "The Need for Speed in Computer Vision", Siggraph Asia, Nov. 2017, 13 pages.
Anonymous, "Low Compute and Fully Parallel Computer Vision with HashMatch", IEEE Conference on Computer Vision (ICCV), Oct. 2017, 10 pages.
Baltrusaitis et al., "OpenFace: an open source facial behavior analysis toolkit", IEEE Winter Conference on Applications of Computer Vision (WACV), Mar. 2016, 10 pages.
Bhandari et al., "Resolving Multi-path Interference in Time-of-Flight Imaging via Modulation Frequency Diversity and Sparse Regularization", Optics Letters, vol. 39, Issue 6, Apr. 2014, 11 pages.
Blanz et al., "A Morphable Model for the Synthesis of 3D Faces", Siggraph New York, 1999, 8 pages.
Bleyer et al., "PatchMatch Stereo—Stereo Matching with Slanted Support Windows", British Machine Vision Conference (BMVC), Sep. 2011, 11 pages.
Bleyer et al., "Extracting 3D Scene-consistent Object Proposals and Depth from Stereo Images", European Conference on Computer Vision (ECCV), Oct. 2012, 14 pages.
Butler et al., "Shake'n'Sense: Reducing Interference for Overlapping Structured Light Depth Cameras", Conference on Human Factors in Computing Systems (CHI), May 2012, 4 pages.
Cao et al., "FaceWarehouse: a 3D Facial Expression Database for Visual Computing", IEEE Transactions on Visualization and Computer Graphics, vol. 20, Issue 3, Mar. 2014, 11 pages.
Chen et al., "Object Modeling by Registration of Multiple Range Images", IEEE International Conference on Robotics and Automation, Apr. 1991, 6 pages.
Collet et al., "High-Quality Streamable Free-Viewpoint Video", ACM Transactions on Graphics (TOG), vol. 34, Issue 4, Aug. 2015, 13 pages.
D'Asaro et al., "The VCSEL Advantage: Increased Power, Efficiency Bring New Applications", <https://www.photonics.com/a25102/The_VCSEL_Advantage_Increased_Power_Efficiency>, Accessed May 17, 2018, 6 pages.
Dou et al., "Fusion4D: Real-time Performance Capture of Challenging Scenes", Siggraph '16, Jul. 2016, 13 pages.
Fanello et al., "One-Shot Learning for Real-Time Action Recognition", Iberian Conference on Pattern Recognition and Image Analysis (IbPRIA), Jun. 2013, 10 pages.
Fanello et al., "3D Estimation and Fully Automated Learning of Eye-Hand Coordination in Humanoid Robots", IEEE-RAS International Conference on Humanoid Robotics, Nov. 2014, 8 pages.
Fanello et al., "Keep It Simple and Sparse: Real-Time Action Recognition", Journal of Machine Learning Research, vol. 14, 2013, 24 pages.
Fanello et al., "Learning to be a Depth Camera for Close-Range Human Capture and Interaction", ACM Transactions on Graphics (TOG), vol. 33, Issue 4, Jul. 2014, 11 pages.
Fanello et al., "Filter Forests for Learning Data-Dependent Convolutional Kernels", IEEE International Conference on Computer Vision and Pattern Recognition (CVPR), Jun. 2014, 8 pages.
Fanello et al., "HyperDepth: Learning Depth from Structured Light Without Matching", IEEE International Conference on Computer Vision and Pattern Recognition (CVPR), Jun. 2016, 10 pages.
Fanello et al., "UltraStereo: Efficient Learning-based Matching for Active Stereo Systems", IEEE International Conference on Computer Vision and Pattern Recognition (CVPR), Jul. 2017, 10 pages.
Forster et al., "SVO: Fast Semi-Direct Monocular Visual Odometry", International Conference on Robotics and Automation (ICRA), Jun. 2014, 8 pages.
Freedman et al., "SRA: Fast Removal of General Multipath for ToF Sensors", European Conference on Computer Vision (ECCV), Sep. 2014, 16 pages.
Geng, "Structured-light 3D surface imaging: a tutorial", Advances in Optics and Photonics, vol. 3, Issue 2, 2011, 33 pages.
Gori, et al., "Ranking the Good Points: A Comprehensive Method for Humanoid Robots to Grasp Unknown Objects", IEEE International Conference on Advanced Robotics (ICAR), Nov. 2013, 7 pages.
Handa et al., "Real-Time Camera Tracking: When is High Frame-Rate Best?", European Conference on Computer Vision (ECCV), Oct. 2012, 14 pages.
Horn et al., "Determining Optical Flow", Artificial Intelligence, vol. 17, Issues 1-3, Aug. 1981, 19 pages.
Hosni et al., "Fast Cost-Volume Filtering for Visual Correspondence and Beyond", IEEE Transactions on Pattern Analysis and Machine Intelligence, vol. 35, Issue 2, Feb. 2013, 8 pages.
Izadi et al., "KinectFusion: Real-time 3D Reconstruction and Interaction Using a Moving Depth Camera", ACM Symposium on User Interface Software and Technology (UIST), Oct. 2011, 10 pages.
Jimenez et al., "Modelling and Correction of Multipath Interference in Time of Flight Cameras", IEEE Conference on Computer Vision and Pattern Recognition, Jun. 2012, 8 pages.
Keselman et al., "Intel RealSenseTM Stereoscopic Depth Cameras", IEEE International Conference on Computer Vision and Pattern Recognition (CVPR), CVPR Workshop, Jul. 2017, 10 pages.
************************** Keskin et al., "Hand Pose Estimation and Hand Shape Classification Using Multi-layered Randomized Decision Forests", European Conference on Computer Vision (ECCV), Oct. 2012, 2 pages.
Kim et al., "Real-Time 3D Reconstruction and 6-DoF Tracking with an Event Camera", European Conference on Computer Vision (ECCV), Oct. 2016, 16 pages.
Li et al., "Realtime Facial Animation with On-the-fly Correctives", ACM Transactions on Graphics (TOG), vol. 32, Issue 4, Jul. 2013, 9 pages.

(56) References Cited

OTHER PUBLICATIONS

Li et al., "Database-Assisted Object Retrieval for Real-Time 3D Reconstruction", ACM Transactions on Graphics (TOG), vol. 34, Issue 2, Feb. 2015, 12 pages.
Lu et al., "Hybrid HFR Depth: Fusing Commodity Depth and Color Cameras to Achieve High Frame Rate, Low Latency Depth Camera Interactions", Conference on Human Factors in Computing Systems (CHI), May 2017, 10 pages.
Naik et al., "A Light Transport Model for Mitigating Multipath Interference in Time-of-flight Sensors", IEEE International Conference on Computer Vision and Pattern Recognition (CVPR), Jun. 2015, 9 pages.
Nakabo et al., "1ms Column Parallel Vision System and It's Application of High Speed Target Tracking", IEEE International Conference on Robotics and Automation (ICRA) Apr. 2000, 6 pages.
Newcombe et al., "DynamicFusion: Reconstruction and Tracking of Non-rigid Scenes in Real-Time", IEEE International Conference on Computer Vision and Pattern Recognition (CVPR), Jun. 2015, 10 pages.
Newcombe et al., "KinectFusion: Real-Time Dense Surface Mapping and Tracking", IEEE International Symposium on Mixed and Augmented Reality, Oct. 2011, 10 pages.
Orts-Escolano et al., "Holoportation: Virtual 3D Teleportation in Real-time", ACM Symposium on User Interface Software and Technology (UIST), Oct. 2016, 14 pages.
United States Department of Labor, Occupational Safety and Health Administration, OSHA Technical Manual (OTM), <https://www.osha.gov/dts/osta/otm/>, Accessed Jun. 28, 2018, 2 pages.
Pan et al., "Catching a Real Ball in Virtual Reality", IEEE Virtual Reality (VR), Mar. 2017, 2 pages.
Pradeep et al., "MonoFusion: Real-time 3D Reconstruction of Small Scenes with a Single Web Camera", IEEE International Symposium on Mixed and Augmented Reality (ISMAR), Oct. 2013, 6 pages.
Rebecq et al., "EVO: A Geometric Approach to Event-Based 6-DOF Parallel Tracking and Mapping in Real-time", IEEE Robotics and Automation Letters, vol. 2, Issue 2, Apr. 2017, 8 pages.
Lang, "Analysis of Valve's 'Lighthouse' Tracking System Reveals Accuracy", <https://www.roadtovr.com/analysis-of-valves-lighthouse-tracking-system-reveals-accuracy/>, Accessed Jun. 28, 2018, 3 pages.
Rusinkiewicz et al., "Efficient Variants of the ICP Algorithm", International Conference on 3D Digital Imaging and Modeling, May 2001, 8 pages.
Salvi et al., "A state of the art in structured light patterns for surface profilometry", Pattern Recognition, vol. 43, Issue 8, Aug. 2010, 36 pages.
Scharstein et al., "A Taxonomy and Evaluation of Dense Two-Frame", IEEE Workshop on Stereo and Multi-Baseline Vision (SMBV), Dec. 2001, 61 pages.
Shotton et al., "Real-Time Human Pose Recognition in Parts from Single Depth Images", IEEE International Conference on Computer Vision and Pattern Recognition (CVPR), Jun. 2011, 8 pages.
Shotton et al., "Scene Coordinate Regression Forests for Camera Relocalization in RGB-D Images", IEEE International Conference on Computer Vision and Pattern Recognition (CVPR), Jun. 2013, 8 pages.
International Search Report and Written Opinion dated Nov. 19, 2018 for corresponding International Applicatino No. PCT/US2018/043629; 17 pages.
Stuhmer et al., "Model-Based Tracking at 300Hz using Raw Time-of-Flight Observations", International Conference on Computer Vision (ICCV), Dec. 2015, 9 pages.
Taylor et al., "Efficient and Precise Interactive Hand Tracking Through Joint, Continuous Optimization of Pose and Correspondences", ACM Transactions on Graphics (TOG), vol. 35, Issue 4, Jul. 2016, 12 pages.
Thies et al., "Face2Face: Real-time Face Capture and Reenactment of RGB Videos", IEEE International Conference on Computer Vision and Pattern Recognition (CVPR), Jun. 2016, 9 pages.
Thies et al., "FaceVR: Real-Time Gaze-Aware Facial Reenactment in Virtual Reality", arXiv Submission, arXiv: 1610.03151, Submitted Oct. 2016, Revised Mar. 2018, 16 pages.
Tsai et al., "Real Time Versatile Robotics Hand/Eye Calibration using 3D Machine Vision", IEEE International Conference on Robotics and Automation (ICRA), Apr. 1988, 8 pages.
Valentin et al., "SemanticPaint: Interactive 3D Labeling and Learning at your Fingertips", ACM Transactions on Graphics (TOG), vol. 34, Issue 5, Oct. 2015, 16 pages.
Vlasic et al., "Face Transfer with Multilinear Models", ACM Transactions on Graphics (TOG), vol. 24, Issue 3, Jul. 2005, 10 pages.
Wang et al., "The Global Patch Collider", IEEE Conference on Computer Vision and Pattern Recognition (CVPR), Jun. 2016, 9 pages.
Webster et al., "Experimental Evaluation of Microsoft Kinect's Accuracy and Capture Rate for Stroke Rehabilitation Applications", IEEE Haptics Symposium (Haptics), Feb. 2014, 6 pages.
Zollhofer et al., "Real-time Non-rigid Reconstruction using an RGB-D Camera", ACM Transactions on Graphics (TOG), vol. 33, Issue 4, Jul. 2014, 12 pages.
International Preliminary Report on Patentability dated Dec. 12, 2019 for corresponding International Application No. PCT/US2018/043629; 11 pages.

\* cited by examiner

SYSTEM AND METHOD FOR ACTIVE STEREO DEPTH SENSING

CROSS REFERENCE TO RELATED APPLICATIONS

This application claims priority to U.S. Provisional Patent Application No. 62/513,181, entitled "The Need for Speed in Computer Vision" and filed on May 31, 2017, the entirety of which is incorporated by reference herein.

BACKGROUND

Depth cameras are used as inputs for computer vision tasks such as hand, body, or object tracking, 3D reconstruction, and simultaneous localization and mapping (SLAM). For such tasks, each new frame of depth and image data is correlated to a previous frame, allowing for pose or geometric reconstruction over time. However, for depth cameras operating at relatively low speed (i.e., capturing a low number of frames per second), high frame-to-frame movements in a scene and artifacts such as motion blur make correlations between frames difficult to solve.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
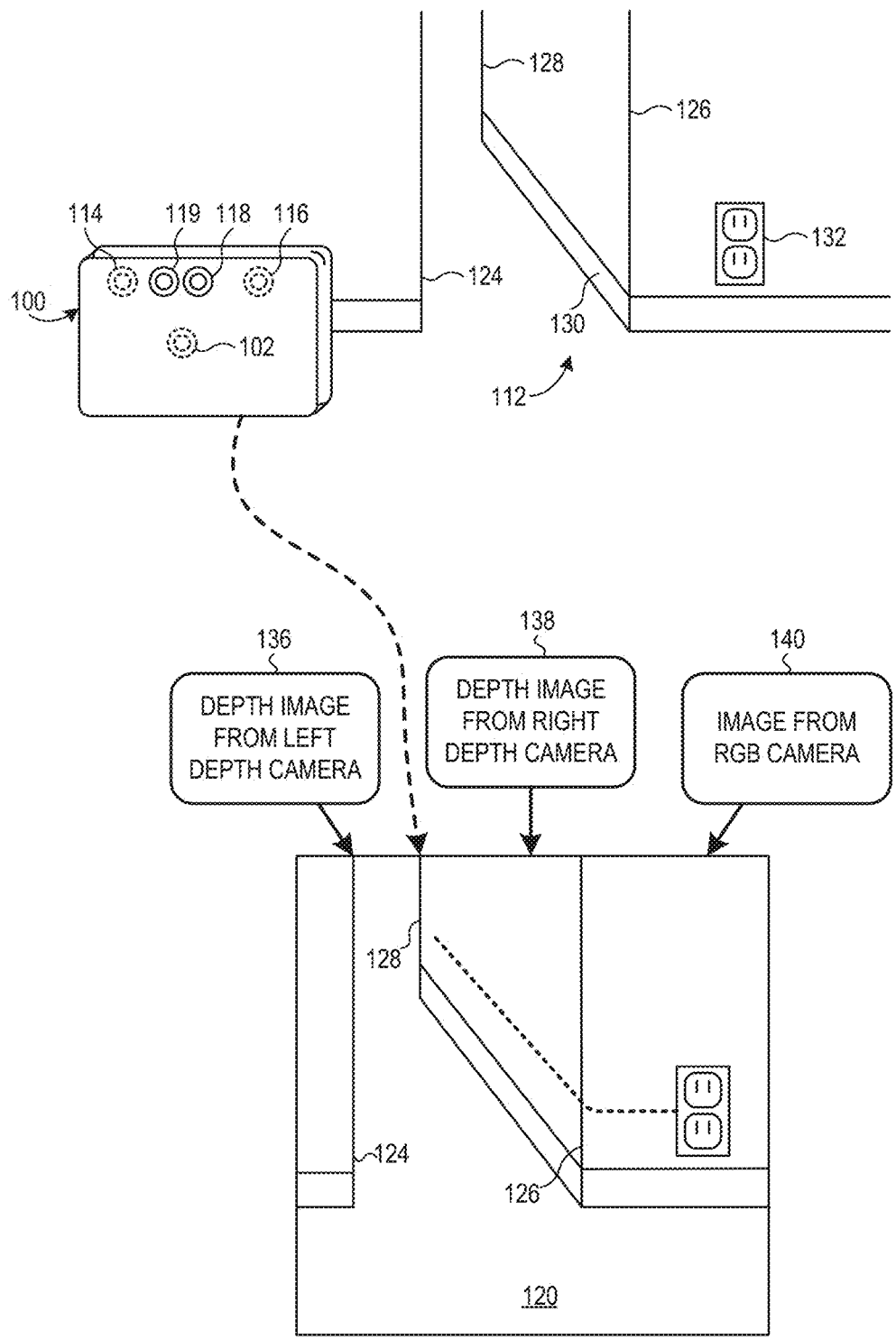
FIG. 1 is a diagram illustrating an electronic device using an active stereo depth camera to estimate a depth map of an environment in accordance with some embodiments.

The following description is intended to convey a thorough understanding of the present disclosure by providing a number of specific embodiments and details involving estimating a depth map of an environment based on alternating stereo depth images. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-5 illustrate techniques for estimating a depth map of an environment by an electronic device based on stereo depth images captured by depth cameras having exposure times that are offset from each other in conjunction with illuminators pulsing illumination patterns into the environment so as to support location-based functionality, such as augmented reality (AR) functionality, virtual reality (VR) functionality, visual localization/odometry or other simultaneous localization and mapping (SLAM) functionality, and the like. A first illuminator pulses a first illumination pattern into the environment at a first frequency and phase, while a second illuminator pulses a second illumination pattern into the environment at the first frequency and a second phase. A first depth camera captures depth images of the environment during the times the first illuminator is pulsing the first illumination pattern, and a second depth camera captures depth images of the environment during the times the second illuminator is pulsing the second illumination pattern. In some embodiments, the electronic device dynamically changes the projected patterns over time.

A processor of the electronic device matches small sections (referred to as patches) of the depth images from the first and second cameras to each other and to corresponding patches of one or more immediately preceding depth images of the environment (e.g., a spatio-temporal image patch "cube"). The processor computes a matching cost for each spatio-temporal image patch cube by converting each spatio-temporal image patch into binary codes and defining a cost function between two stereo (left and right) image patches as the difference between the binary codes. The processor minimizes the matching cost to generate a disparity map. The processor optimizes the disparity map by identifying and rejecting outliers using a decision tree with learned pixel offsets and refining subpixels to generate a depth map of the environment. By leveraging the relatively fast framerate of the depth cameras to include previous depth images in computing a matching cost for stereo depth imaging, the electronic device reduces noise in the matching while allowing for smaller spatial windows (patches), which results in better performance along depth discontinuities. In addition, by varying the projected patterns over time, the electronic device minimizes bias effects from stereo matching. By using the decision tree to identify and reject outliers, the electronic device lowers the computation cost otherwise consumed by cross-checking and decouples the computation from the resolution of the images.

FIG. 1 illustrates an electronic device 100 configured to support location-based functionality, such as SLAM, VR, or AR, using depth image data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a television remote, and the like. In other embodiments, the electronic device 100 can include another type of mobile device, such as a head-mounted display, single camera, multi-sensor camera, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a plurality of sensors to obtain information regarding a local environment 112 of the electronic device 100. The electronic device 100 obtains visual information (imagery) for the local environment 112 via color (RGB) imaging camera 102 and depth cameras 114 and 116. In one embodiment, the imaging camera 102 is implemented as a wide-angle imaging camera having a fish-eye lens or other wide-angle lens to provide a wide-angle view of the local environment 112. The depth camera 114 (also referred to as left depth camera 114), in one embodiment, uses a modulated light illuminator 119 (also referred to as left illuminator 119) to project a first modulated light pattern into the local environment, and captures reflections of the first modulated light pattern as it reflects back from objects in the local environment 112. The depth camera 116 (also referred to as right depth camera 116), in one embodiment, uses a modulated light illuminator 118 (also referred to as right illuminator 118) to project a second modulated light pattern into the local environment, and captures reflections of the second modulating light pattern as it reflects back from objects in the local environment. In some embodiments, the depth cameras 114 and 116 are implemented as a pair of monochrome infrared (IR) cameras with a bandpass filter. Although depth cameras 114 and 116 are referred to as left and right cameras in the example embodiment of FIG. 1, it will be appreciated that in other embodiments the cameras may be in different configurations and arrangements. It will further be appreciated that both cameras can capture images of the same environment concurrently.

In some embodiments, each of the left illuminator 119 and the right illuminator 118 emit infrared (IR) light. In some embodiments, each of the left illuminator 119 and the right illuminator 118 are vertical cavity surface emitting lasers (VCSELs). A VCSEL emits light from a larger surface than a laser, and therefore emits more light while still being safe for eyes. In some embodiments, the left illuminator 119 and the right illuminator 118 are coupled with suitable masks (not shown) to emit structured light (i.e., modulated light patterns). In some embodiments, these modulated light patterns are temporally-modulated light patterns. The captured reflections of the modulated light patterns are referred to herein as "depth images." A processor (not shown) of the electronic device 100 then may calculate the depths of the objects, that is, the distances of the objects from the electronic device 100, based on the analysis of the depth imagery.

In operation, the left illuminator 119 pulses the first illumination pattern into the environment 112 at a first frequency and at a first phase, while the right illuminator 118 pulses the second illumination pattern into the environment at the first frequency and at a second phase, to minimize interference between the first and second illumination patterns. For example, if each of the left depth camera 114 and the right depth camera 116 has an exposure time of 2 ms and runs at 210 frames per second (fps), and each of the left illuminator 119 and the right illuminator 118 pulse their respective illumination patterns into the environment for 2 ms pulses synchronized with the left depth camera 114 and the right depth camera 116's exposure times, respectively, there will be a gap of 4.75 ms between two consecutive frames. Thus, the exposures of the left depth camera 114 and the right depth camera 116 are temporally offset such that they do not interfere with each other even if they are facing one another while maintaining a frame rate of 210 fps. In some embodiments, the first and second phases of pulses are dynamically adjustable. In some embodiments, each of the first and second illumination patterns are a regular grid of dots, and the left illuminator 119 and right illuminator 118 are rotated with respect to each other so that the combination of the two illumination patterns results in a locally unique pattern. In some embodiments, the electronic device 100 includes additional illuminators, each mounted at a slightly different angle. The processor (not shown) activates a different subset of illuminators at each frame of the left depth camera 114 and the right depth camera 116 to generate a varying pattern over time.

The electronic device 100 generates depth data based on the detection of spatial features in image data captured by the depth cameras 114 and 116. To illustrate, in the depicted example of FIG. 1 the local environment 112 includes a hallway of an office building that includes three corners 124, 126, and 128, a baseboard 130, and an electrical outlet 132. In this example, the depth camera 114 captures depth data 136 based on reflections of the first modulated light pattern projected by the illuminator 119 as it reflects back from objects in the local environment 112, and the depth camera 116 captures depth data 138 based on reflections of the second modulated light pattern projected by the illuminator 118 as it reflects back from objects in the local environment 112. In some embodiments, the electronic device trains or calibrates the processor (not shown) based on images 140 of the local environment 112 captured by the RGB camera 102.

The processor (not shown) of the electronic device 100 estimates the depths of objects in the environment 112 via triangulation of corresponding points identified in the depth image 136 from the left depth camera 114 and the depth image 138 from the right depth camera 116, denoted as $I_L$ and $I_R$, respectively. To this end, the processor finds for each pixel $p_L=(x,y)$ in the left image $I_L$ its correspondent pixel $p_R=(x',y')$ in the right image $I_R$. Assuming the stereo system to calibrated and rectified, for each matched pair $p_L$ and $p_R$, $y=y'$. The displacement $d=x-x'$ is referred to as disparity. Given the disparity value d for a given pixel, a depth value $$Z = \frac{bf}{d}$$

is inversely proportional to d. The quantity b is the baseline of the stereo system and f is the focal length.

The processor computes a matching cost defining a distance or similarity function (also referred to as a correlation function) between patches (small sections) of the depth image 136 and the depth image 138. The processor uses the correlation function to find an optimal disparity according to certain criteria, such as lowest distance. In some embodiments, the processor refines disparities to achieve subpixel precision and reject outliers to generate a depth map of the environment 112, as explained further below.

Figure 2:
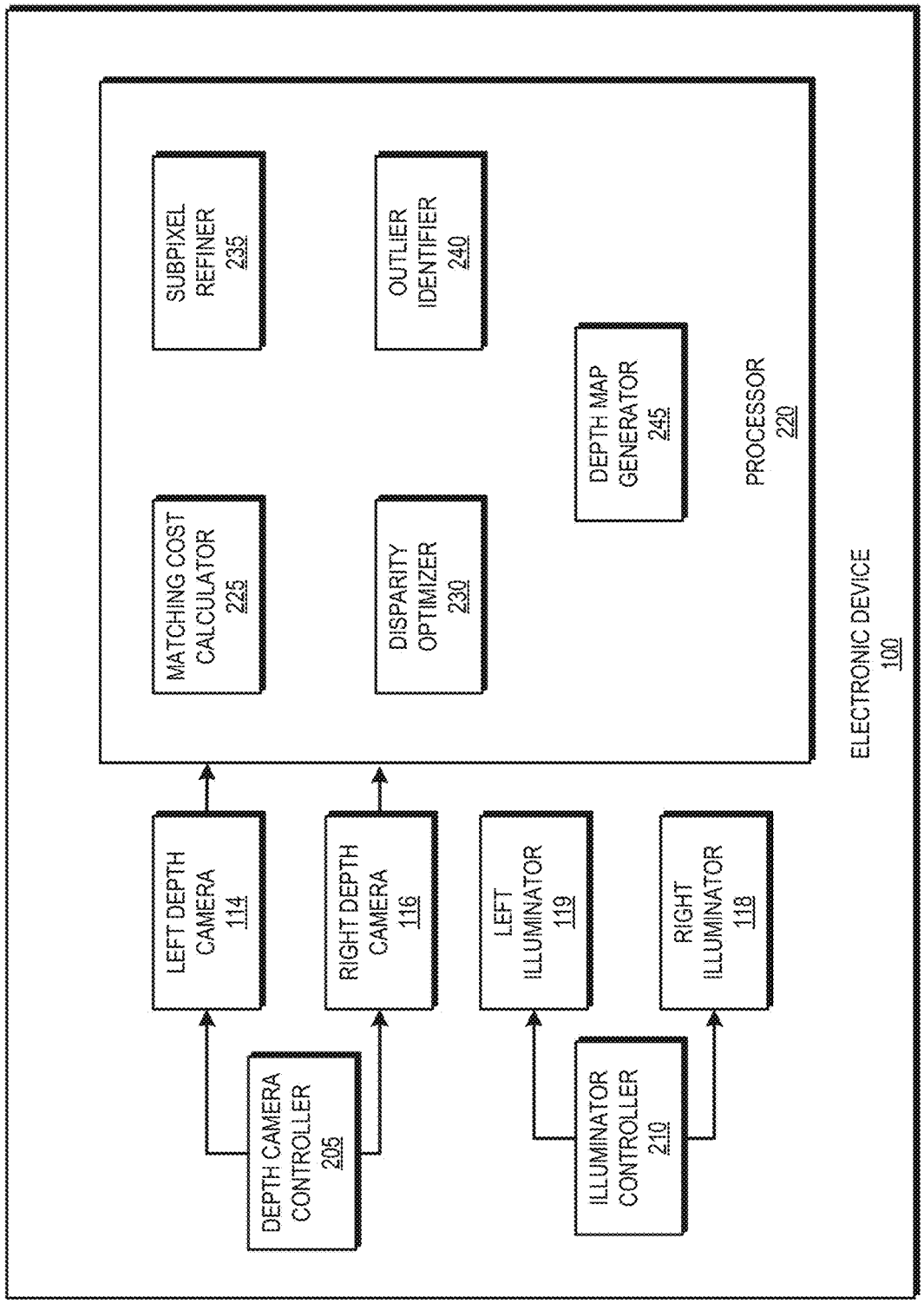
FIG. 2 is a block diagram of the electronic device of FIG. 1 in accordance with some embodiments.

FIG. 2 is a block diagram of the electronic device 100 of FIG. 1 in accordance with some embodiments. The electronic device 100 includes a depth camera controller 205 for controlling the left depth camera 114 and the right depth camera 116, an illuminator controller 210 for controlling the left illuminator 119 and the right illuminator 118, and a processor 220. The processor 220 includes a matching cost calculator 225, a disparity optimizer 230, a subpixel refiner 235, an outlier identifier 240, and a depth map generator 245.

The depth camera controller 205 is a module configured to control the activation and exposure times of the left depth camera 114 and the right depth camera 116. The depth camera controller 205 adjusts the frame rate, exposure time, and phase of the left depth camera 114 and the right depth camera 116. In some embodiments, the depth camera controller 205 ensures that the left depth camera 114 and the right depth camera 116 have non-overlapping exposure times. In some embodiments, the depth camera controller 205 coordinates the frame rate, exposure time, and phase of the left depth camera 114 and the right depth camera 116 in coordination with the illuminator controller 210.

The illuminator controller 210 is a module configured to control the activation and pulse durations of, and illumination patterns projected by, the left illuminator 119 and the right illuminator 118. The illuminator controller 210 activates the left illuminator 119 to pulse a first illumination pattern into the environment at a frequency and phase matched to the frequency and phase of the left depth camera 114, and activates the right illuminator 118 to pulse a second illumination pattern into the environment at a frequency and phase matched to the frequency and phase of the right depth camera 116. Thus, during a time when the left illuminator 119 pulses the first illumination pattern into the environment, the left depth camera 114 captures a depth image, and during the time when the right illuminator 118 pulses the second illumination pattern into the environment, the right depth camera 114 captures a depth image. In some embodiments, the time when the left illuminator 119 pulses the first illumination pattern and time when the right illuminator 118 pulses the second illumination pattern are non-overlapping.

The processor 220 is configured to receive depth images (not shown) from the left depth camera 114 (the left image) and the right depth camera 116 (the right image). In some embodiments, the processor is further configured to receive images from the RGB camera (not shown). The matching cost calculator 225 is a module configured to compute a matching cost for patches (sections) of the left and right image frames. The patch size must be large enough to uniquely identify a pixel based on the texture (from the illumination pattern) in its surrounding area. Given an image patch $x_L$ in the left image and an image patch $x_R$ in the right image of size n, the matching cost calculator 225 computes a matching cost based on their appearance that is independent of the patch (window) size n. The matching cost calculator 225 defines a function b=sign (xW) that remaps every image patch x in a binary representation $b \in \{0,1\}^k$ using k hyperplanes $W \in R^{n \times k}$. In order to have a O (1) mapping that is independent of the signal dimensionality n, the matching cost calculator 225 ensures that the hyperplanes W are sparse. The sparsity enforces that the matching cost calculator 225 only has to access a small subset of pixels inside each patch, which reduces the compute and memory accesses. The matching cost calculator 225 learns a binary mapping signal sign (xW) that preserves the original signal x as much as possible.

In some embodiments, the matching cost calculator 225 computes an inverse linear mapping Z that reconstructs the original space x from the binary codes b. Thus, the matching cost calculator 225 learns a set of sparse hyperplanes $W \in R^{n \times k}$ and an inverse map $Z \in R^{k \times n}$ that minimizes the equation $$W^*, Z^* = \arg\min_{W,Z} \|\text{sign}(XW)Z - X\|^2 + \lambda |W|_1 \qquad (1)$$

where $X \in R^{m \times n}$ is a matrix of training examples. The matching cost calculator 225 uses the $\ell_1$-norm $|W|_1$ to induce sparsity on the hyperplanes W, making the linear mapping independent of the patch dimension n. In some embodiments, the matching cost calculator 225 optimizes the equation using an alternate minimization.

The matching cost calculator 225 extends the linear mapping to spatio-temporal patches based on one or more depth images captured immediately prior to the capture of the left and right images. The matching cost calculator 225 assumes that the motion between subsequent image frames at time t and time t+1 is very small, given the high frame rate of high speed depth cameras 114, 116. Based on the assumed small amount of motion from one frame to the next, the matching cost calculator 225 uses a straight spatio-temporal image volume x (as shown in depth images 350 of FIG. 3) with dimensions n=P×P×F, where P is the spatial window size and F is a temporal buffer of F frames. Because the mapping W is sparse, the mapping does not depend on the temporal buffer size F or on the spatial resolution P. By changing the illumination patterns projected by the left illuminator 119 and the right illuminator 118 over time, the electronic device 100 changes the appearance of the patch over time in order to ensure that the information added across multiple frames is not redundant. By matching with a spatio-temporal window, the matching cost calculator 225 reduces noise in matching, allows for smaller spatial windows, and removes bias effects.

At runtime, the matching cost calculator 225 converts each spatio-temporal image patch x to k=32 binary codes b=sign(xW). The matching cost calculator 225 defines the cost function between two image patches $x^L$ and $x^R$ as the Hamming distance between the codes $b^L$ and $b^R$. The matching cost calculator 225 obtains the computations in O(1) and the computations are independent of the patch size n.

The disparity optimizer 230 is a module configured to identify the image patches of the left and right image frames with the lowest matching cost to generate a disparity map indicating disparities between pixels of the patches of the left and right image frames. In some embodiments, to find the image patches with the lowest matching cost without evaluating all possible disparity labels $d_k$, the disparity optimizer 230 initializes the depth image by testing random disparities for each pixel and selecting the disparity with the smallest Hamming distance in the binary space. For example, in some embodiments, the disparity optimizer 230 tests 32 random disparities for each pixel. Thus, for a pixel $p_i$ with a current lowest disparity $d_i$, the disparity optimizer 230 tests all disparity labels in a 3×3 neighborhood $\mathcal{N}_p$ and selects the one with the best cost. The disparity optimizer 230 defines the cost function as $$d_p^* = \arg\min_{d \in N_p} C(d, p) + \sum_{d_k \in N_p} S(d_k, d) \qquad (2)$$

where $C(d,p) = |b_p^L - b_{p+d}^R|$ is the Hamming distance between the codes at the pixel p in the left image and the codes computed at the location p+d in the right image, wherein a pixel p is defined only by its x component and p+d is a shift along that dimension. The disparity optimizer 230 uses the term $S(d_k,d) = \max(\tau, |d_k - d|)$ to enforce smoothness among neighboring pixels. In some embodiments, the disparity optimizer 230 considers a very small local neighborhood $\mathcal{N}_p = 3 \times 3$, such that it can easily solve the cost function equation by enumerating all the possible solutions in the 3×3 window and selecting the best one. In some embodiments, the disparity optimizer 230 re-iterates the optimization multiple times until it reaches convergence. The disparity optimizer 230 generates a disparity map (not shown) based on the lowest cost calculated for each pixel.

In some embodiments, the disparity optimizer 230 further exploits high frame rate data in the initialization step. For each pixel p at time t, the disparity optimizer 230 tests the pixel's previous disparity at time t−1. If the Hamming distance is lower than all the random disparities, the disparity optimizer 230 uses the previous values to initialize the iterative optimization. Given a 210 fps depth camera, many of the pixels will typically have the same disparity between two consecutive frames.

The subpixel refiner 235 is a module configured to achieve subpixel precision using a parabola interpolation. Given a pixel p with a disparity d, the subpixel refiner 235 fits a parabola by considering the disparities d−1 and d+1. The subpixel refiner 235 computes the Hamming distances of the binary codes for the disparities d, d−1, and d+1 and fits a quadratic function. The subpixel refiner 235 picks as the optimal value of d the best disparity d★ that lies at the global minimum of the quadratic function. In some embodiments, the subpixel refiner 235 repeats the parabola fitting at the end of each iteration of the optimization performed by the disparity optimizer 230 and for every pixel.

The outlier identifier 240 is a module configured to identify and remove invalid pixels directly from the data. The outlier identifier 240 trains by cross-checking a collection of disparity maps of the environment and calculating a weighted median against an RGB image of the environment. The outlier identifier 240 synchronizes and calibrates the left depth camera 114 and the right depth camera 116 against the RGB camera (not shown). The outlier identifier 240 marks each pixel as either "valid" or "invalid" based on cross-checking the depth images against the RGB images and a weighted median filter. The outlier identifier 240 then learns a function that decides to either invalidate or accept a given disparity. In some embodiments, to keep the computation low and independent of the image resolution, the outlier identifier 240 uses a decision tree to determine pixel validity.

The outlier identifier 240 populates a node in the decision tree with two learned pixel offsets $u=(\Delta x, \Delta y)$ and $v=(\Delta x', \Delta y')$ and a threshold value $\tau$. When evaluating a pixel at position $p=(x,y)$, the decision tree of the outlier identifier 240 decides where to route a particular example based on the sign of $I(p+u)-I(p+v) > \tau$, where $I(p)$ is the intensity value of a pixel p. In some embodiments, at training time, the outlier identifier 240 samples 500 possible split parameters $\delta=(u, v, \tau)$ for the current node. Each $\delta$ induces a split on the set S of the data into left $S_L(\delta)$ and right $S_R(\delta)$ child sets. The outlier identifier 240 selects the set of parameters $\delta$ that maximizes the Information Gain defined as:

$$IG(\delta) = E(S) - \sum_{d \in L, R} \frac{|S_d(\delta)|}{|S|} E(S_d(\delta)) \quad (3)$$

where the entropy $E(S)$ is the Shannon entropy of the empirical distribution $p(valid|S)$ of the class label "valid" in S. Each leaf node contains a probability of $p(valid|p,l)$ and the outlier identifier 240 invalidates pixels when this quantity is less than 0.5.

The depth map generator 245 is a module configured to generate a three-dimensional (3D) point cloud (referred to as a depth map) for each image frame pair from the left depth camera 114 and the right depth camera 116 based on the disparity map generated by the disparity optimizer 230. In some embodiments, the depth map generator 245 further bases the depth map on the subpixel refinements identified by the subpixel refiner 235. In some embodiments, the depth map generator 245 additionally bases the depth map on the validity determinations made by the outlier identifier 240. The depth map can be used as an input for efficient, low latency, high quality computer vision algorithms including scene and object scanning, non-rigid tracking, and hand tracking.

Figure 3:
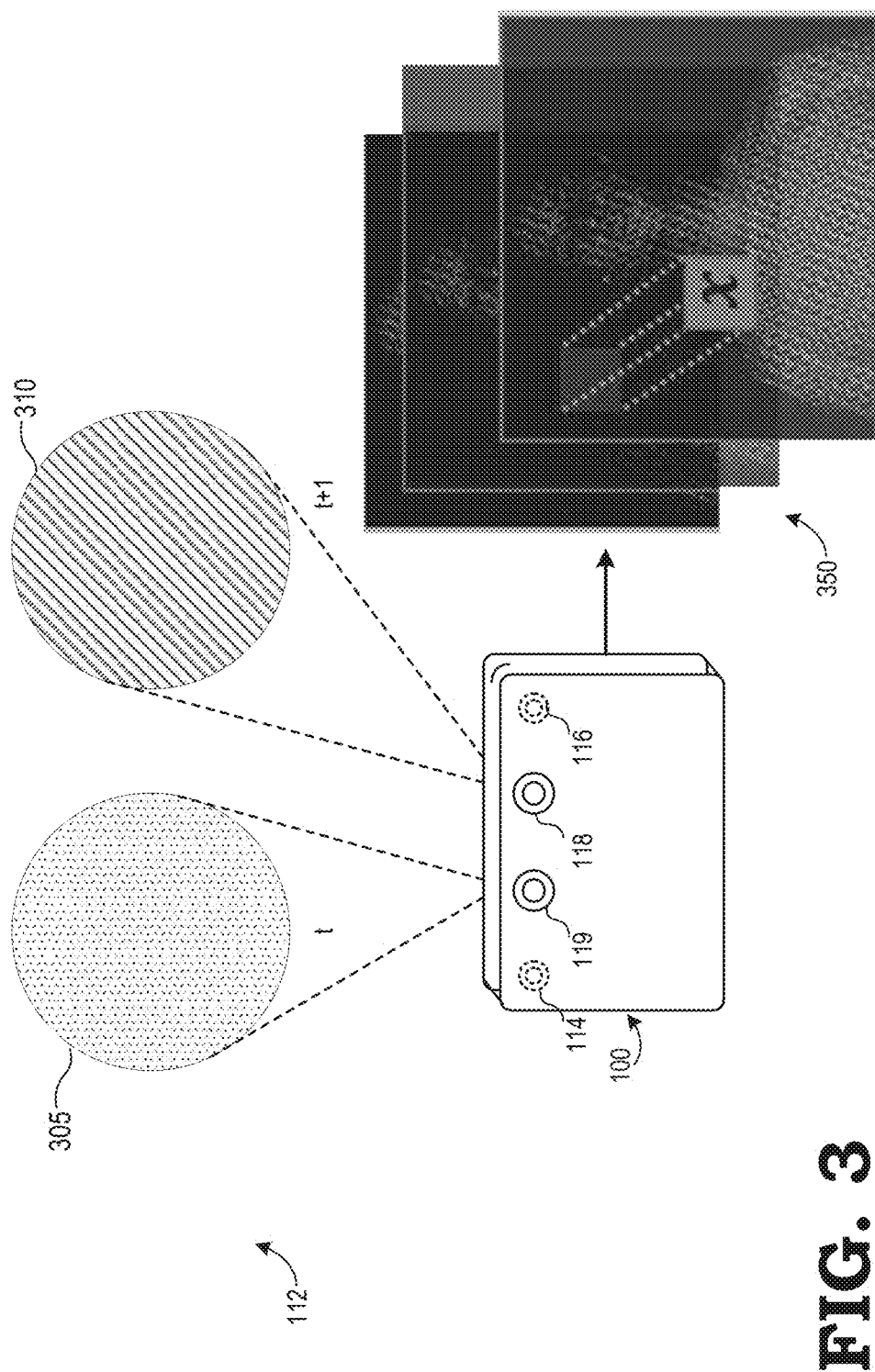
FIG. 3 is a diagram illustrating the illuminators of the electronic device alternately projecting two illumination patterns into an environment in accordance with some embodiments.

FIG. 3 illustrates the illuminators 118 and 119 of the electronic device 100 alternately projecting two illumination patterns 305 and 310 into the environment 112 in accordance with some embodiments. In some embodiments, the illumination patterns 305, 310 are regular dot grids rotated with respect to each other such that their combination results in a locally unique pattern. The left illuminator 119 pulses a first illumination pattern 305 into the environment 112 at a first frequency and at a first phase, while the right illuminator 118 pulses a second illumination pattern 310 into the environment 112 at the first frequency and at a second phase offset from the first phase. Thus, the left illuminator 119 pulses the illumination pattern 305 during a first time t and the right illuminator 118 pulses the illumination pattern 310 during a second time t+1. In some embodiments, the illuminator controller (not shown) varies the first and second illumination patterns over time to minimize depth bias from the reflected patterns.

The depth camera controller (not shown) activates the left depth camera 114 in coordination with the pulsing of the left illuminator 119 and activates the right depth camera 116 in coordination with the pulsing of the right illuminator 118. Thus, in some embodiments, the depth camera controller activates the left depth camera 114 to capture a depth image during the time t, and activates the right depth camera 116 to capture a depth image during the time t+1 to produce a set of depth images 350. By alternately pulsing the left and right illuminators 118, 119 and alternately activating the left and right depth cameras 114, 116, the electronic device 100 avoids interference between the illuminators 118, 119 and the depth cameras 114, 116. In some embodiments, the depth camera controller and the illuminator controller adjust the phases of the illuminators 118, 119 and the depth cameras 114, 116 to minimize interference.

Figure 4:
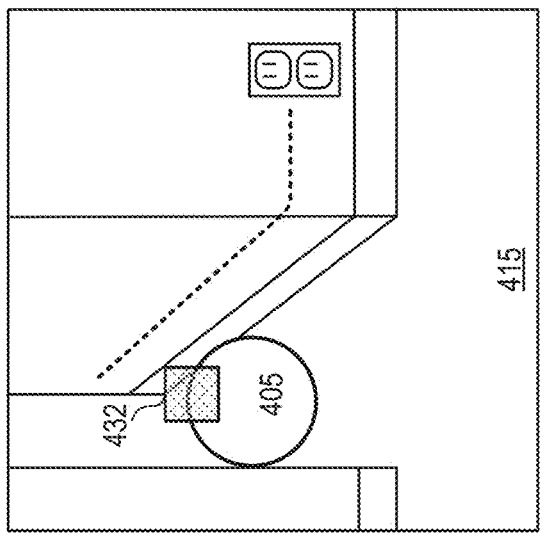
FIG. 4 is a diagram illustrating the electronic device matching a patch from each of a depth image from a first depth camera, a depth image from a second depth camera, and a previous depth image in accordance with some embodiments.
Figure 4:
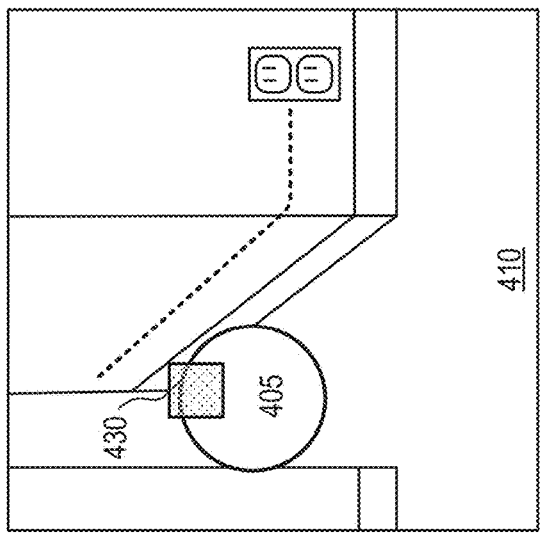
Figure 4:
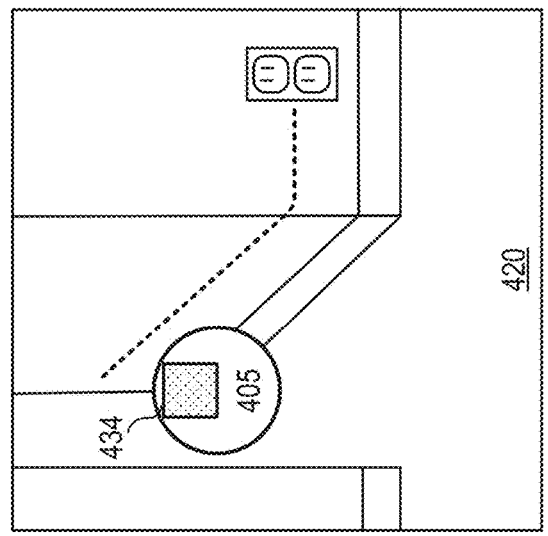

FIG. 4 is a diagram illustrating the matching cost calculator 225 of FIG. 2 matching patches 430, 432, 434 from each of a depth image 410 from a first depth camera, a depth image 415 from a second depth camera, and a previous depth image 420 in accordance with some embodiments. In the illustrated example, each of the depth images 410, 415, 420 illustrates a ball 405 rolling along a hallway toward the depth cameras. The matching cost calculator 225 computes a binary descriptor (code) for each pixel from the spatio-temporal neighborhood within patches 430, 432, and 434 and defines a cost that pixels in the depth images 410 and 415 are originating from the same scene point as the Hamming distance of the binary codes.

Figure 5:
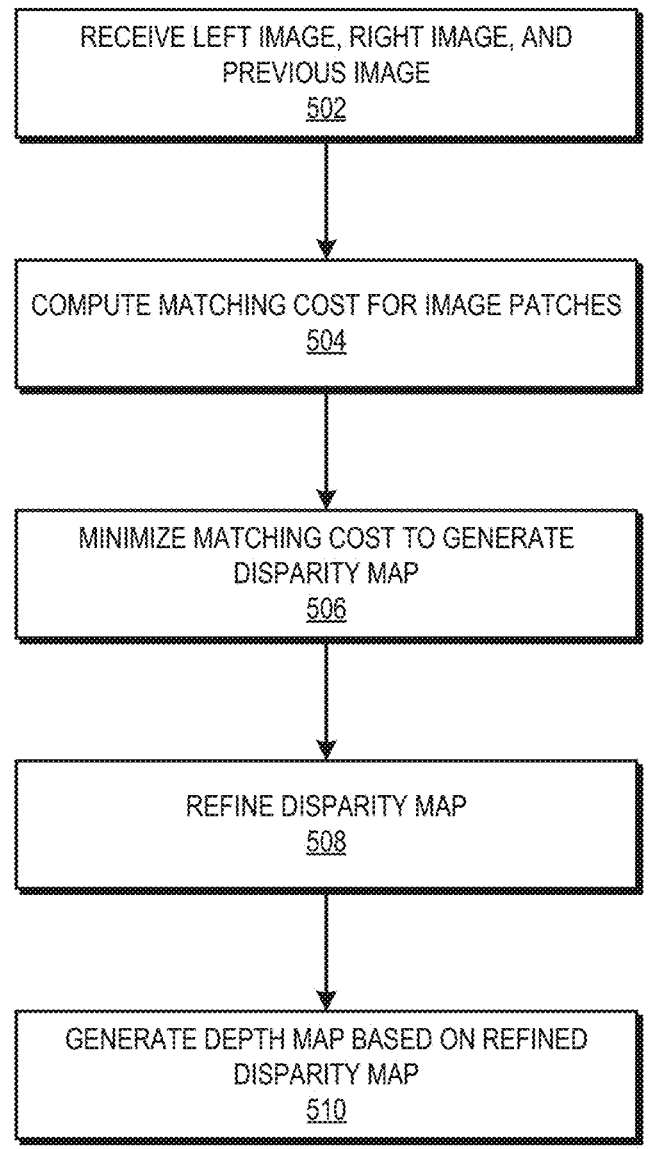
FIG. 5 is a flow diagram illustrating a method of estimating a depth map based on captured depth images in accordance with some embodiments.

FIG. 5 is a flow diagram illustrating a method 500 of estimating a depth map based on captured depth images in accordance with some embodiments. At block 502, the processor 220 of the electronic device 100 receives a left depth image, a right depth image, and the depth image captured immediately prior to the capture of the left and right depth images. At block 504, the matching cost calculator 225 computes a matching cost for each patch of the left and right depth images. At block 506, the disparity optimizer minimizes the matching cost to generate a disparity map. At block 508, the subpixel optimizer 235 refines subpixel precision using a parabola interpolation and the outlier identifier 240 identifies and removes invalid pixels from the disparity map. At block 510, the depth map generator 245 generates a 3D point cloud based on the refined disparity map.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
projecting, at an illuminator of an electronic device, a first illumination pattern into an environment of the electronic device at a frequency and a first phase and a second illumination pattern into the environment of the electronic device at the frequency and a second phase, wherein the second illumination pattern is rotated with respect to the first illumination pattern;
dynamically adjusting at least one of the first phase and the second phase;
capturing, at a depth camera of the electronic device, a first depth image of the environment at the frequency and the first phase and a second depth image of the environment at the frequency and the second phase;
computing, at a processor of the electronic device, a matching cost for corresponding portions of the first depth image and the second depth image, wherein each of the corresponding portions comprises a plurality of pixels of the first and second depth images; and
identifying the corresponding portions of the first depth image and the second depth image based on the matching cost to generate a disparity map indicating disparities between pixels of the corresponding portions of the first depth image and the second depth image; and
estimating a depth map of the environment based on the disparity map.

2. The method of claim 1, wherein the second illumination pattern differs from the first illumination pattern.

3. The method of claim 1, wherein the illuminator comprises a vertical cavity surface emitting laser (VCSEL).

4. The method of claim 1, further comprising temporally varying the first and second illumination patterns.

5. The method of claim 1, further comprising refining the disparities in the disparity map by identifying a probability that a pixel is valid and rejecting pixels with identified probabilities of validity below a threshold to estimate the depth map.

6. The method of claim 5, wherein identifying a probability that a pixel is valid comprises identifying that the pixel is valid based on a decision tree that sparsely samples spatially neighboring pixels of the pixel.

7. The method of claim 1, further comprising refining the disparities in the corresponding portions based on fitting a parabola to the disparities of each pixel.

8. The method of claim 1, wherein computing the matching cost further comprises:
computing a matching cost for corresponding portions of the first depth image, the second depth image, and one or more depth images captured immediately prior to capturing the first depth image.

9. The method of claim 1, further comprising:
tracking, using the electronic device, locations of a hand captured using the depth camera based on the depth map.

10. The method of claim 1, wherein dynamically adjusting comprises dynamically adjusting at least one of the first phase and the second phase such that a time when the first illumination pattern is projected into the environment and a time when the second illumination pattern is projected into the environment are non-overlapping.

11. A method comprising:
pulsing, at a first illuminator of an electronic device, a first illumination pattern into an environment of the electronic device at a first phase and a first frequency;
pulsing, at a second illuminator of the electronic device, a second illumination pattern into the environment of the electronic device at a second phase and the first frequency, wherein the second illumination pattern is rotated with respect to the first illumination pattern;
dynamically adjusting at least one of the first phase and the second phase;
capturing, at a first depth camera of the electronic device, a first series of depth images of the environment at the first phase and the first frequency;
capturing, at a second depth camera of the electronic device, a second series of depth images of the environment at the second phase and the first frequency;
comparing, at a processor of the electronic device, a first patch of a first depth image of the first series of depth images to a second patch of a second depth image of the second series of depth images, wherein each patch comprises a plurality of pixels;
computing a cost function for the compared patches;
generating a disparity map indicating disparities between corresponding pixels of corresponding patches of the first depth image and the second depth image based on the cost function; and
refining the disparities of the disparity map to generate an estimated depth map of the environment.

12. The method of claim 11, further comprising temporally varying the first and second illumination patterns.

13. The method of claim 11, further comprising refining the disparities in the corresponding pixels by identifying a probability that a pixel is valid and rejecting pixels with identified probabilities of validity below a threshold.

14. The method of claim 11, wherein identifying a probability that a pixel is invalid is based on a decision tree that sparsely samples spatially neighboring pixels of the pixel.

15. The method of claim 11, wherein comparing further comprises:
comparing a first patch of a first depth image of the first series of depth images to a second patch of a second depth image of the second series of depth images and at least one patch of each of one or more depth images captured immediately prior to the first depth image.

16. The method of claim 11, further comprising:
tracking, using the electronic device, locations of a hand captured using the first depth camera and the second depth camera based on the estimated depth map.

17. The method of claim 11, wherein dynamically adjusting at least one of the first phase and the second phase comprises dynamically adjusting at least one of the first phase and the second phase such that a time when the first illumination pattern is pulsed into the environment and a time when the second illumination pattern is pulsed into the environment are non-overlapping.

18. An electronic device comprising:
a first illuminator to project a first illumination pattern into an environment at a first time;
a second illuminator to project a second illumination pattern into the environment at a second time different from the first time;
a first depth camera to capture a first depth image of the environment at the first time;
a second depth camera to capture a second depth image of the environment at the second time;
a processor to:
compute a matching cost for a spatio-temporal image patch, the spatio-temporal image patch generated from corresponding portions of the first depth image, the second depth image, and one or more depth images captured immediately prior to the first depth image, wherein each of the corresponding portions comprises a plurality of pixels of the depth images;
identify the corresponding portions of the first depth image and the second depth image that minimize the matching cost to generate a disparity map indicating disparities between pixels of the corresponding portions of the first depth image and the second depth image; and
refine the disparities of the disparity map to generate an estimated depth map of the environment.

19. The electronic device of claim 18, wherein the second illumination pattern differs from the first illumination pattern.

20. The electronic device of claim 18, wherein the second illumination pattern is rotated with respect to the first illumination pattern.

21. The electronic device of claim 18, wherein the first and second illuminators are configured to temporally vary the first and second illumination patterns.

22. The electronic device of claim 18, wherein the processor is to refine the disparities in the corresponding portions by identifying a probability that a pixel is valid and rejecting pixels with identified probabilities of validity below a threshold.

23. The electronic device of claim 22, wherein the processor is to identify a probability that a pixel is invalid based on a decision tree that sparsely samples spatially neighboring pixels of the pixel.

24. The electronic device of claim 18, wherein the processor is to refine the disparities in the corresponding portions based on fitting a parabola to the disparities of each pixel.

25. The electronic device of claim 18, further comprising:
one or more additional illuminators, wherein each of the first illuminator, the second illuminator, and the one or more additional illuminators is mounted at a different angle.

26. The electronic device of claim 18, wherein the processor is to track locations of a hand captured using the first depth camera and the second camera based on the estimated depth map.

* * * * *